United States Patent [19]

Borchard

[11] Patent Number: 4,738,324

[45] Date of Patent: Apr. 19, 1988

[54] SELF-ADJUSTING WEIGHING SYSTEM

[76] Inventor: John S. Borchard, 36 Whitney Tavern Rd., Weston, Mass. 02193

[21] Appl. No.: 18,176

[22] Filed: Feb. 24, 1987

[51] Int. Cl.$^4$ .................. G01G 23/22; G01G 3/14; G01G 3/00

[52] U.S. Cl. ................... 177/25; 177/210 C; 177/225; 177/255

[58] Field of Search .......... 177/210 C, 255, 25.14, 177/225

[56] References Cited

U.S. PATENT DOCUMENTS

| | | | |
|---|---|---|---|
| 3,966,002 | 6/1976 | Schneider | 177/210 C X |
| 4,273,204 | 6/1981 | Gillen | 177/225 X |
| 4,401,173 | 8/1983 | Komoto | 177/255 X |
| 4,629,019 | 12/1986 | Harrington et al. | 177/210 C |
| 4,646,859 | 3/1987 | Stuart | 177/255 X |
| 4,679,643 | 7/1987 | Bove | 177/210 C |

Primary Examiner—George H. Miller, Jr.
Attorney, Agent, or Firm—John P. McGonagle

[57] ABSTRACT

A weighing system for measuring gems and other very light masses with means for correcting errors in the measured value of said masses due to off-center placement on the system's holding pan. The system uses three or more transducers about the pan to measure the weight of the mass, and contains means for correlating the various transducer sensed values for a given mass at given locations to arrive at a true weight value for the mass in spite of its location on the system's holding pan.

28 Claims, 5 Drawing Sheets

SELF-ADJUSTING WEIGHING SYSTEM

BACKGROUND OF THE INVENTION

This invention relates generally to measuring apparatus for very light masses, and more particularly to an electronic balance capable of correcting an error in the measured value due to off-center placement of the mass to be weighed.

There are many ways to measure weight. One problem they all face is that of off-center pan loading in which the mass to be weighted is not located at the exact center of the weighing pan, but is off to one side. In general, when a load is placed deviatedly from a required point of placement, such as the the center of the pan, the bending moment exerted on the pan thereby produces an error in the measured value. In the current state of the art there are two basic ways of handling the problem of off-center loading. The present invention discloses a third way.

The two basic ways of handling the problem of off-center pan loading in the current state of the art consist of: "hanging pan" and "parallel-motion" techniques. The "hanging pan" technique consists of a pan suspended from a knife-edge support at a single point, such that gravity will twist the pan so as to locate its center of gravity directly below the pan support. This prevents bending moments in the load sensing mechanism. With the "parallel-motion" technique a parallel-motion linkage is attached to the pan. This absorbs the bending moments caused by off-center loading and prevents their being applied to the loadcell.

The hanging pan technique is mechanically simple with a simple sensor. It has a very tall vertical scale dimension, but no adjustments for off-center loading are required. However, friction at the knife-edge and overall inertia are sources of error when weighing very light masses. Devices constructed in accordance with this technique tend to be bulky, and the pan's hanger is often in the way when loading. Leveling of the overall device is important.

Devices constructed in accordance with the parallel-motion technique are mechanically complex. They are top-loading and have a thick, but simple sensor. The vertical scale dimension is less than that of a hanging pan, but is still substantial. Adjustment for off-center loading is required through mechanical adjustments of linkage. Misadjustment of the linkage is a common source of error. Leveling of the device is very important.

U.S. Pat. No. 4,401,173 and 4,482,022 to A. Komoto disclose an electronic balance constructed in accordance with the parallel-motion technique, but with the addition of multiple sensors for detecting a possible deviation of the load acting point from the required point on the pan, and with the addition of electronics for correcting an error in the measured value due to the said deviation. The key to Komoto is the detection and measurement of a possible deflection occurring in the pan support (12) due to the turning moment exerted on the pan by a load being placed deviatedly from a required point of placement, such as the center of the pan. According to Komoto, the deflection occurring in the pan support (12) will be in the horizontal X-Y plane. Komoto also discloses a version for use in large-scaled electronic balances in which a pan is supported by two supports which in turn provide force acting lines to two levers each resting on a fulcrum. The levers are connected to each other by means of a pin and are connected to a load measuring section.

SUMMARY OF THE INVENTION

The present invention is designed primarily to weigh very light masses and discloses a third way of handling the problem of off-center pan loading. This technique is a self-adjusting one in which the effects of off-center loading in the load cell are measured and corrected before the weight reading is outputted. The device constructed in accordance with this technique measures deflections at a plurality of locations on a spring-supported pan, and combines these separate measurements to yield the weight on the pan, corrected for load placement location, i.e., off-center loading. The deflection measurements are accomplished using a plurality of capacitors formed between two rigid, closely-spaced plates with specific patterns on the plates forming the capacitors. These are not actually three separate capacitors, but one device acting like three different capacitors and/or performing as if it were three separate capacitors. The plates are glued to the weight bearing pan and a base. The plates are held apart by three or more springs spaced around the periphery of the plates. The measurements are electronically gathered as measured values, $f_c$, for each capacitor. Adjustment factors are pre-inputted at the factory. The adjustment factors are: $k_s$ for the amount the weight bearing pan tips in the direction of a capacitor due to the springs; $k_o$ for any off-center due to manufacture and some nonparallelity of capacitor plates; and $k_T$ for initial capacitor gaps and/or problems with parallelity or flatness of capacitor plates. A calculated weight is then found by satisfying the following equation:

$$w = [\Sigma k_s f_c + k_o[(f_1-f_2)^2 + (f_2-f_3)^2 + (f_1-f_3)^2] + k_T]$$

where $\Sigma k_s f_c = k_1 f_1 + k_2 f_2 + k_3 f_3$ and the displayed weight, d, is:

$$d = [(SPAN)w + TARE]$$

where SPAN=compensation for temperature drift and leveling, and TARE=zeroing function on turn on due to possible drift in null weight, pan weight, dust, etc.

The present invention may be distinguished from Komoto in two major areas. Firstly, the Komoto balance is constructed in accordance with the parallel-motion technique, i.e., it contains a Roberval mechanism. Therefore, it has basically one pan support and one transducer for measuring actual load weight. The present invention does not have a Roberval mechanism, but rather uses three or more pan supports and transducers for measuring actual load weight. Secondly, Komoto corrects for off-center loading by measuring the deviation of the pan support in the horizontal X-Y plane. The present invention corrects for off-center loading by measuring the vertical deviation in each transducer as the load is placed in various locations on the pan. The present invention replaces the Komoto large-scaled electronic balance mechanical levers and fulcrums with electronics. The Komoto mechanical levers and arms are subject to length changes due to heat thereby making that version of the Komoto balance unusable for the sensitivity and accuracy required for measuring very light masses.

The present invention has pronounced advantages over the current state of the art. The present invention has the mechanical simplicity of the hanging pan, the convenience of use of a top-loading device, and far superior size characteristics than any device in the current state of the art. The vertical scale dimension for the present invention is substantially less than any device constructed according to the hanging pan or parallel-motion techniques. No mechanical adjustments are required, such as for the parallel-motion family of devices. The calibration procedure is entirely electronic and may be automated. The present invention is more compact and portable, and has greater tolerance during manufacture and use than the weighing systems forming the current state of the art.

DESCRIPTION OF THE PREFERRED EMBODIMENT

Figure 1:
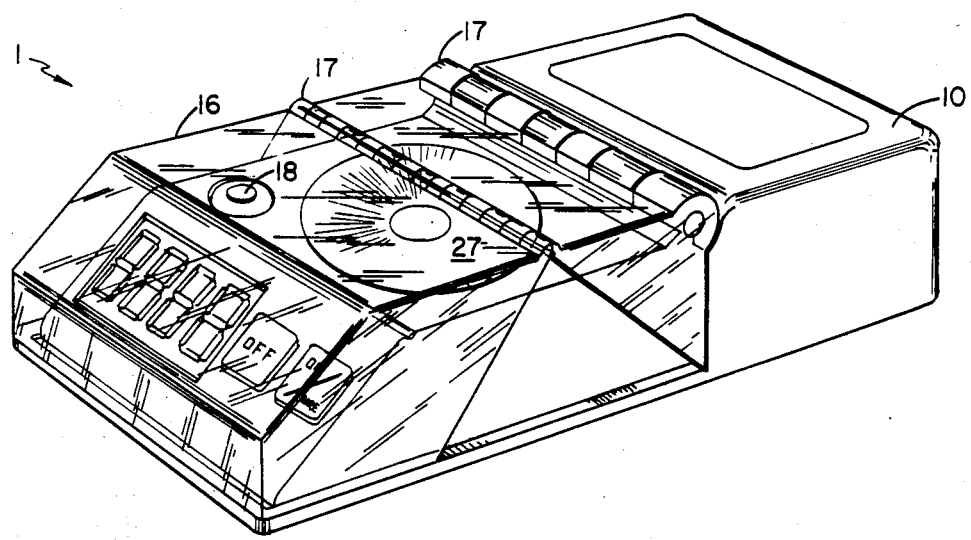
FIG. 1 is a perspective view of a weighing system constructed in accordance with the instant invention.
Figure 2:
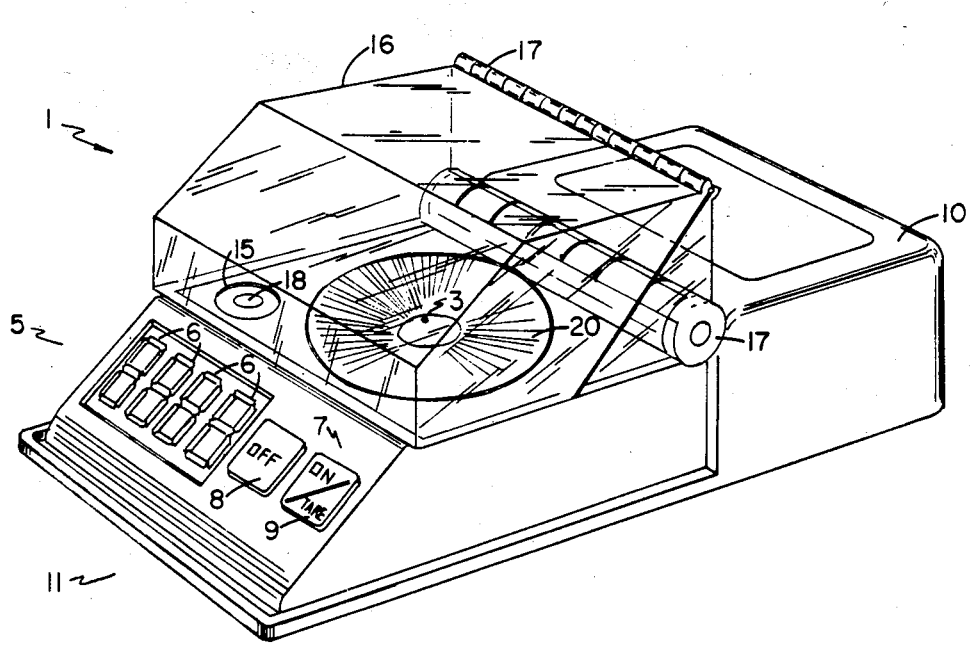
FIG. 2 shows the invention of FIG. 1 in use.

Referring now to the drawings in detail, wherein like numerals refer to like elements, reference numeral 1 refers generally to a preferred embodiment of the instant invention. This embodiment of the invention is a self-contained scale for accurately measuring the weight of gems or other very light masses 3. The invention 1 provides a digital reading on an LCD display 5 of the weight of the item 3 being weighed. The invention 1 is enclosed within a casing 10 and has over its top front half a transparent dust cover 16 which may be completely opened, exposing a platform or pan 20 upon which the mass 3 to be weighed is placed. The casing front 11 is shaped at a forty-five degree angle from the casing bottom 12 back to the casing top 13. The plane of the pan 20, which is approximately two inches in diameter, is slightly below the casing top 13 so that the cover 16 may be fully closed without touching the pan 20. The casing front 11 contains LCD alphanumeric digits 6 which form the LCD display 5. The casing front 11 also contains a simple keyboard 7 with two keys 8 and 9. The OFF key 8 shuts the system 1 down. The ON/-TARE key 9 turns the system power on. Shortly after turn on, the system 1 automatically performs a TARE function which is a zeroing function compensating for possible drift in null weight, pan weight, dust, etc. After the TARE function is complete, the LCD display 5 will display the letters CAL and wait. When CAL is displayed, a calibration weight 18 is placed on the weighing pan 20. The dust cover 16 is bent back over the pan 20 as shown in FIG. 2. The design of the cover's hinges 17 permits the cover 16 to be setup over the pan 20 in a partially closed position while a weighing or calibration procedure takes place. This eliminates errors in the measured value from air motion. When the calibration weight 18 is placed on the pan 20 the system 1 accomplishes the SPAN function. SPAN is a routine for compensating for temperature drift and leveling once the measurement due to the calibration weight 18 is known. When the SPAN function is complete, the display 5 will no longer show CAL but will display the calibration weight. The system 1 is then ready for live weighing. Externally visible in the casing top 13 just forward and to the side of the pan 20 is a small, generally cylindrical cavity 15 for holding the calibration weight 18. The cavity 15 is deep enough so that the top of the stored calibration weight 18 does not interfere with the cover 16 when fully closed. The casing 10 is approximately one inch high, five inches long, and three inches wide. The casing bottom 12 has several sealable holes 19 used for factory calibration, which will be discussed in more detail below.

Figure 3:
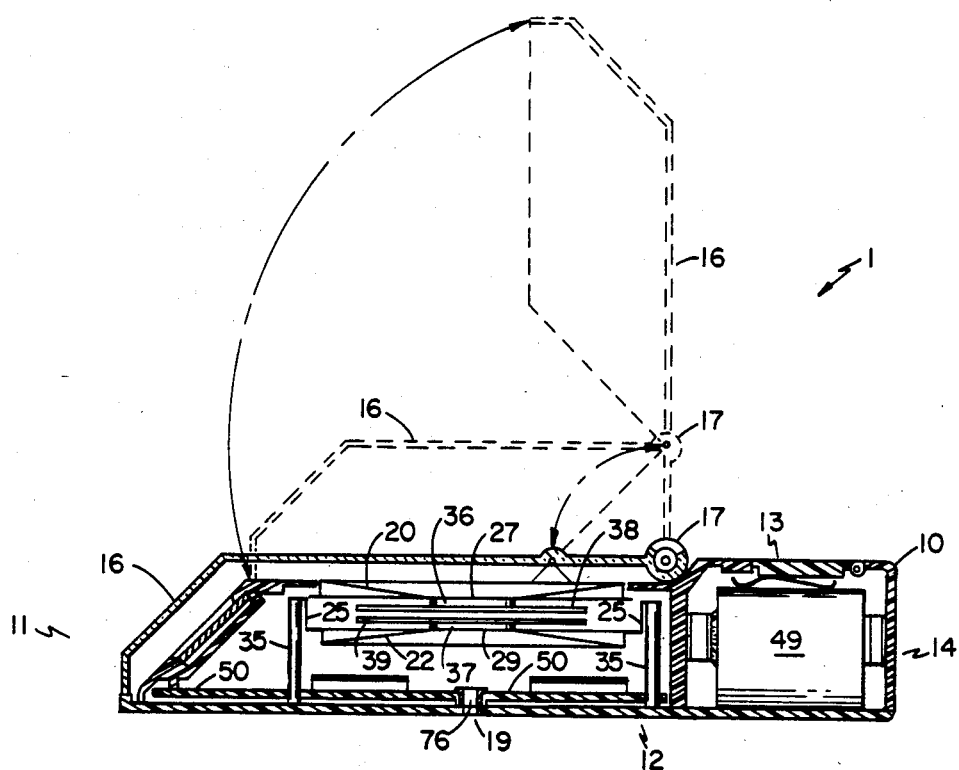
FIG. 3 is a cut away side view of the invention of FIGS. 1 and 2.

FIG. 3 is a cut away side view of the invention 1. The position of the pan 20 in a general plane parallel to the casing top 13 is readily visible. Three vertical support posts 35, two of which are visible, are attached to the casing bottom 12 and hold the pan and sensor assembly 21. the pan and sensor assembly 21 is shown in detail in FIGS. 4 and 5. Below the pan and sensor assembly 21 in a plane generally parallel to the casing bottom 12, extending from the casing front 11 nearly twothirds of the way toward the casing rear 14, and also held in place by the support posts 35, is an electronic circuit board 50 which contains the invention's electronics. Positioned inside and toward the casing rear 14 is a battery 49 which provides power to the circuit board 50.

Figure 6:
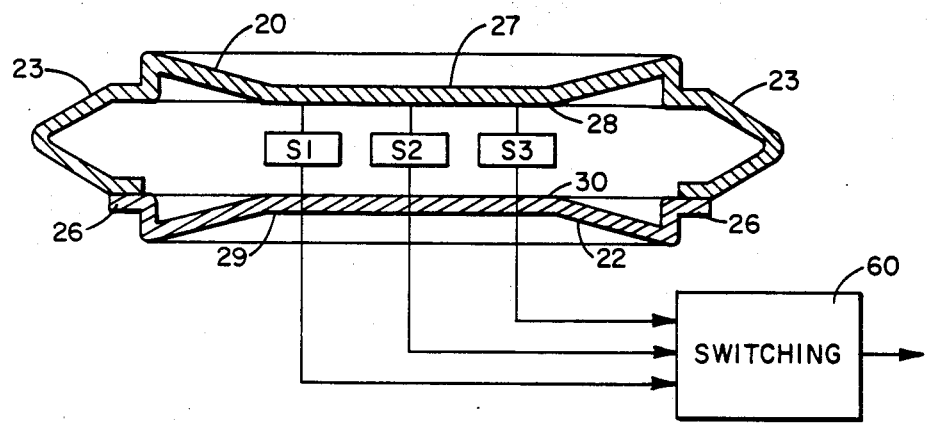
FIG. 6 shows in schematic form an exemplary embodiment of the pan and sensor assembly.
Figure 4:
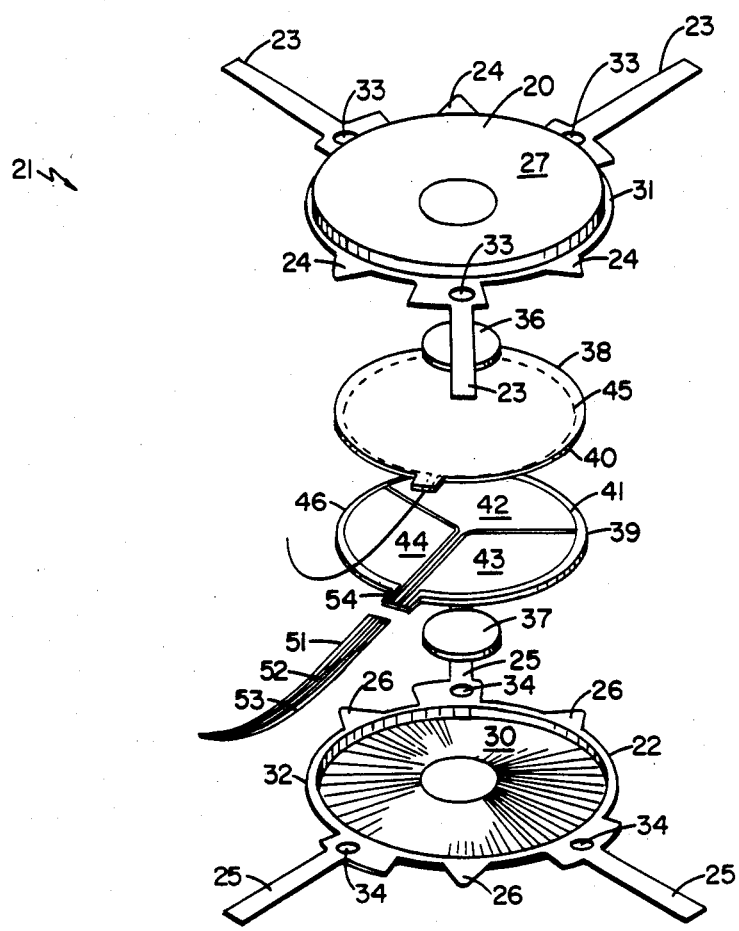
FIG. 4 is a perspective exploded view of an unassembled pan and sensor assembly.
Figure 5:
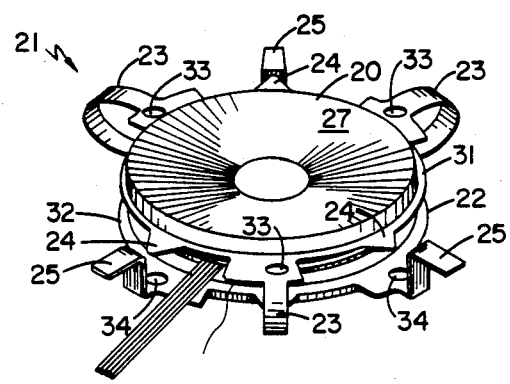
FIG. 5 is a perspective view of an assembled pan and sensor assembly.

Referring specifically to FIGS. 4 and 5 which show the pan and sensor assembly in detail, and generally to FIGS. 3 and 6, it can be seen that the assembly 21 includes two, relatively rigid, concave pans 20 and 22 in a mirror relationship with each other and having their resultant convex surfaces 28 and 30 facing each other. Each pan 20 and 22 has three flat strips 23 and 25, respectively, radiating outwardly from its periphery, 31 and 32 respectively. Each pan 20 and 22 also has three flat stubs 24 and 26, respectively, radiating outwardly from its periphery 31 and 32, respectively. The strips 23 and 25 of each pan 20 and 22 are positioned one hundred twenty degrees from each other. The stubs 24 and 25 are positioned sixty degrees from each strip 23 and 25, respectively. The strips 23 of the upper pan 20 are positioned over the stubs 26 of the bottom pan 22. The strips 23 of the top pan 20 are bent around and downwardly to the stubs 26 of the bottom pan 22 immediately beneath, and glued, welded or soldered thereto forming leaf springs. The strips 25 of the bottom pan 22 are bent upwardly and outwardly at right angles for attachment to the support posts 35. The bottom pan 22, therefore, is mounted to the three support posts 35 at points approximately one hundred twenty degrees from each other about the peripheral circumference of the bottom pan 22. The top pan 20 is connected to the bottom pan 22 by means of three leaf springs 23 formed at the peripheral edges 31 and 32 of the pans 20 and 22 at points approximately sixty degrees from the bottom pan's strips 25. Two small, flat, rigid disks 36 and 37 are soldered to the top and bottom pan convex side 28 and 30 (inside and facing) centers. The top disk 36 translates the off-center placement of the mass 3 to be weighed on the top pan's concave face 27 into a predictable disk tipping movement, thereby compensating for any tendency of the pan 20 to twist due to off-center placement of the mass 3 to be weighed. The bottom disk 37 provides a flat, rigid point of reference for the tipping movement of the upper disk 36. Two flat, rigid plates 38 and 39, respectively, are glued to the top and bottom disks 36 and 37 respectively. The bottom plate 39 is made of nonconductive material, but has a specific pattern of conductive material silk screened onto its nonglued side 41, consisting of three, separate, symmetrical, roughly one hundred twenty degree, pie-shaped regions 42, 43, and 44. The top plate 38 is also made of a nonconductive material. Its nonglued side 40 has a solid, three hundred sixty degree conductive region 45 silk screened on. In effect, the two plates 38 and 39 form three, pie-shaped capacitor-sensors $S_1$, $S_2$, and $S_3$. All the electrical connections 51, 52, and 53 for the lower plate 39 are brought out to one area 54 on the lower capacitor plate's periphery 46. The leaf springs 23 translate the weight of the object 3 being measured into displacement between the plates 38 and 39. The three capacitors formed by the elements 45,42 and 45,43 and 45,44 are roughly twenty to thirty picofarads each, and are employed as sensors in which the weight applied against the sensor affects a change of capacitance which is converted by conventional electronics to a frequency proportional to the variation in capacitance. Thus, electrical outputs are obtainable which are analogs of the weight of the object 3 being measured, the variation in values of the three capacitors 45,42 and 45,43 and 45,44 reflecting tipping from the position of the object 3 being measured on the pan 20 as well as its weight. In the instant invention 1, perfect centering of the object 3 to be measured on the top pan 20 would mean nominally that the capacitance values for each of the capacitors 45,42 and 45,43 and 45,44 would be the same. However, the slightest deviation from perfect nominal centering would mean that the capacitance values for each would be different. This is the basis of the present invention.

Figure 7:
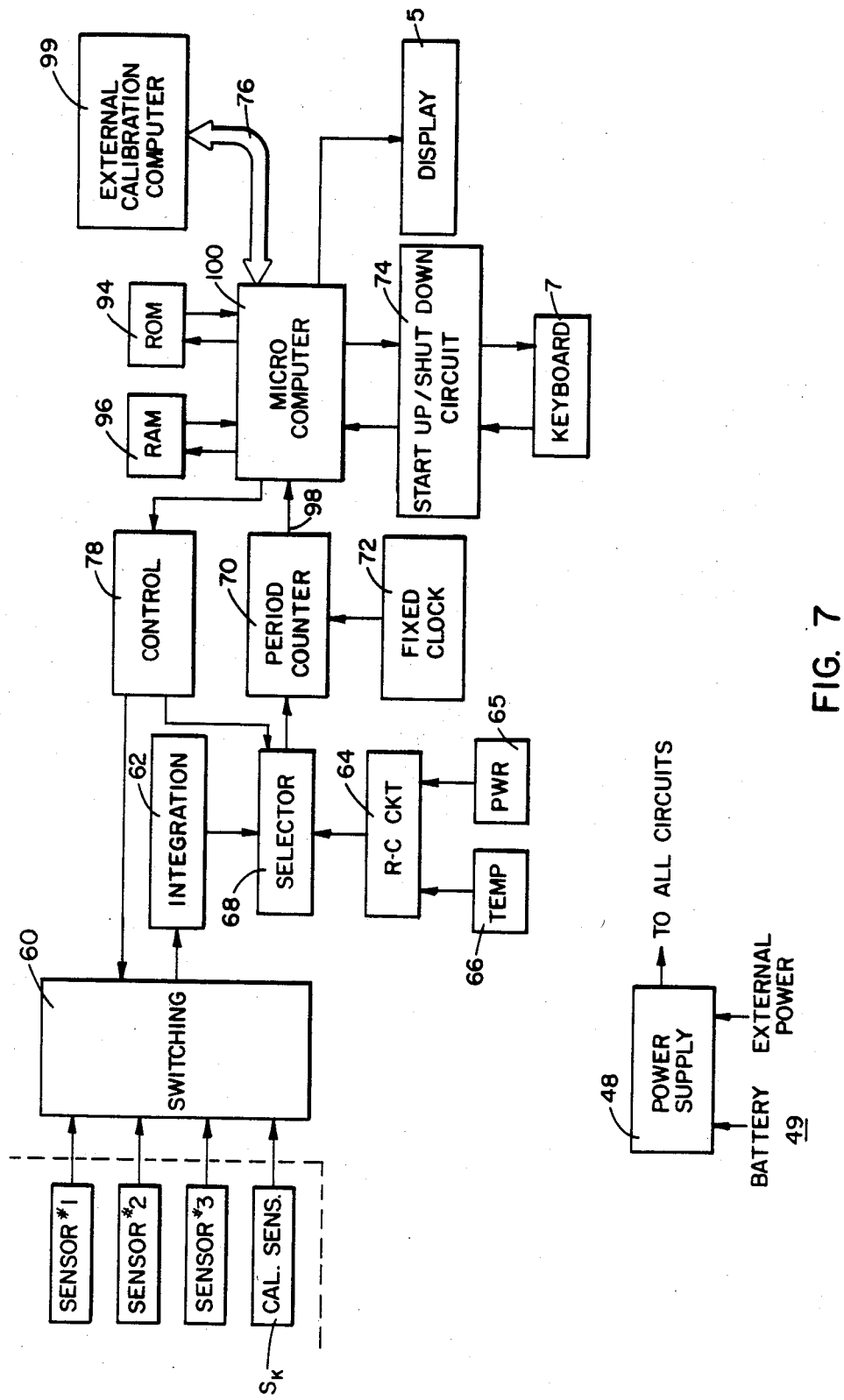
FIG. 7 shows in block diagram form, the processor electronics of the instant invention.

Referring now to FIGS. 6 and 7, the references $S_1$, $S_2$, and $S_3$ designate capacitance-sensor values from the three capacitors formed by the elements 45,42 and 45,43 and 45,44. The values are analogs of the weight of the object 3 being weighed and reflect the position of the object 3 on the pan 20. The sensors $S_1$, $S_2$, and $S_3$ are each selected, one-at-a-time, by analog switching 60 under control 78 from a computer 100, and used in an integration-type circuit 62 to create a frequency $f_c$ in the one kilohertz range, where $f_c = f_1$ or $f_2$ or $f_3$ depending upon which capacitor-sensor $S_1$, $S_2$, $S_3$ was selected. Each capacitor $S_1$, $S_2$, and $S_3$ is sampled and averaged for one hundred milliseconds at a time. In addition, a dummy (fixed) capacitor $S_k$ is mounted on the circuit board 50 and may be selected to produce a known frequency $f_k$ for calibration use. An R-C circuit 64 using a fixed one hundredth microfarad capacitor may also be used to measure the system power supply 48 voltage across a fixed three hundred thousand ohm resistor 65, or to measure temperature sensitivity across a temperature-sensitive resistor 66. This information, in the form of a frequency $f_v$ for voltage, or $f_T$ for temperature, would be used by the invention's computers 100 to compensate for variations in temperature and voltage, and would generally be used during the TARE and SPAN functions.

These several frequencies are chosen by a selector circuit 68 under computer control 78. The chosen frequency passes to a period counter circuit 70 which counts a fixed clock 72 frequency for a number of cycles of the chosen variable frequency. Under computer control 78 the counter 70 is cleared, allowed to count for the desired period, subsequently read over the computer bus 98, and then placed in RAM 96 as a number. The fixed clock 72 frequency is in the one megahertz range. Software resident in the computer 100 processes all these separate numbers into either a weight or an error indication, which is displayed on the liquid crystal display 5, driven from latched outputs which are derived from the computer bus 98.

There is also a startup/shutdown circuit 74 which starts the computer on detection of a closure in the ON/TARE switch 9, and shuts down the computer 100 to save current drain from the battery 49 when the software signals it to do so. This circuit 74 also provides an indication to the software that the ON/TARE 9 or OFF 8 switches have been pressed.

The power supply 48 provides a regulated five volts to the electronic circuitry of the invention 1. The circuit power may be provided by either a Nickel-Cadmium battery 49 or by an external power source.

A typical example of the weighing operation is as follows. The cover 16 is lifted and put into a partially open position covering the pan 20. The ON switch 9 is pressed. The TARE function is then automatically done by the invention 1. This function reads a null weight and compensates for dust, pan weight, etc., ensuring that a zero weight is measured and displayed. The LCD display 5 then signals to the user the SPAN function by displaying the letters CAL. This is the signal to the user to place the calibration weight 18 onto the pan 20. Again the cover 16 is partially set up over the pan 20 in a partially closed position while the calibration process takes place. The invention 1 then adjusts for invention tipping and drift. When the SPAN function is complete, the display 5 will then register the proper weight of the calibration weight 18, and the invention 1 will be ready for actual weighing operations. The cover 16 is fully opened, the calibration weight 18 removed and placed into the cavity 15, and a gem or other very light object 3 is then placed onto the pan 20. The cover 16 is again setup over the pan 20 in a partially closed position while the weighing process takes place. Each of the leaf springs 23 will most likely compress a different amount due to off-center loading. Consequently, the three sensors $S_1$, $S_2$, and $S_3$ will sense different weights and will generate capacitance values corresponding to the different weights sensed. The computer 100 will direct the analog switch 60 to sample each sensor $S_1$, $S_2$, and $S_3$ one-at-a-time, for one hundred milliseconds each. The sensor being sampled is switched into an integration circuit 62 where a frequency $f_c$ corresponding to the value of the sampled sensor is outputted to a selector circuit 68. The frequency $f_c$ of the sensor being sampled is passed to a period counter circuit 70 which counts a fixed clock 72 frequency for a number of cycles of chosen variable frequency $f_c$. The result of this step is that a number for $f_c$ is then stored in computer memory (RAM) 96. In this embodiment of the invention 1 three capacitor type sensors $S_1$, $S_2$, and $S_3$ are measured resulting in three values of $f_c$, namely $f_1$, $f_2$, and $f_3$. Other embodiments of the invention 1 may have a greater number of sensors. It would appear that three sensors are the minimum required.

A bidirectional communications link 76 exists for testing and calibration through holes 19 in the casing bottom 12 by an external calibration computer 99. This is not accessible in normal use by a user, but is essential to the factory calibration process, in which a number of constants, i.e., $k_S$, $k_o$, and $k_T$, are written into the invention's computer memory (ROM) 94 and retained there during all subsequent use. During factory calibration, the invention 1 is connected to, and controlled by, the calibration computer 99 over the communications link 76. The computer 99 will read the measured sensor outputs $S_1$, $S_2$, and $S_3$ for a number of different, known weights, compute coefficients $k_S$ (i.e., $k_1$, $k_2$, and $k_3$), $k_o$, and $k_T$, send them back to the invention 1 and test the resulting weight readings. In this embodiment of the invention 1, three lead springs 23 are used, and, therefore, $k_S$ will have three values, namely $k_1$, $k_2$, and $k_3$.

With $f_1$, $f_2$, and $f_3$ known, and with $k_1$, $k_2$, $k_3$, $k_o$, and $k_T$ having been previously determined at the factory and placed into the invention's computer memory (ROM) 94, the calculated weight w may then be found by satisfying the following equation:

$$w = [k_1 f_1 + k_2 f_2 + k_3 f_3 + k_o[(f_1 - f_2)^2 + (f_2 - f_3)^2 + (f_1 - f_3)^2] + k_T]$$

The displayed weight, d, therefore, is:

$$d = [(SPAN)w + TARE]$$

the SPAN and TARE functions having been determined when the invention 1 was first turned on and calibrated.

It is understood that the above described embodiment is merely illustrative of the application. In this embodiment, the bottom pan 22 acts as a base for the pan and sensor assembly 21. In another embodiment, the bottom pan 22 could be removed and the remainder of the pan and sensor assembly 21 could rest on the circuit board 50 or the casing bottom 12. Other embodiments, therefore, may be readily devised by those skilled in the art which will embody the principles of the invention and fall within the spirit and scope thereof.

Figure 8:
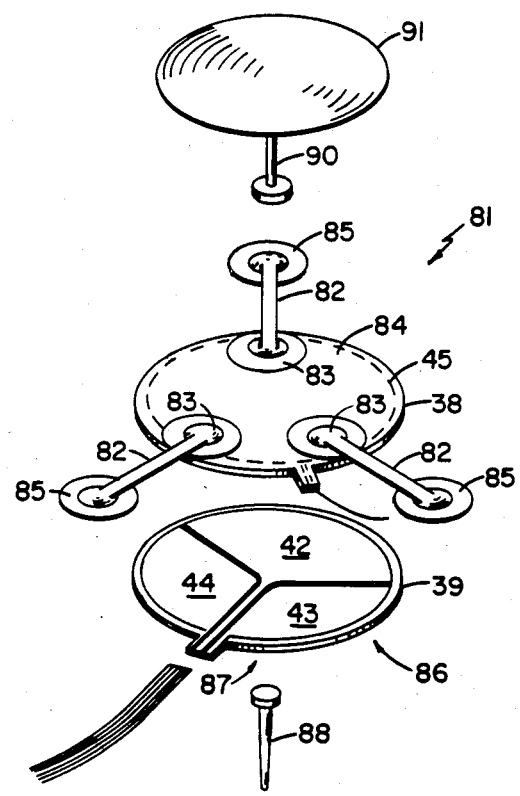
FIG. 8 is a perspective exploded view of another embodiment of a pan and sensor assembly.
Figure 9:
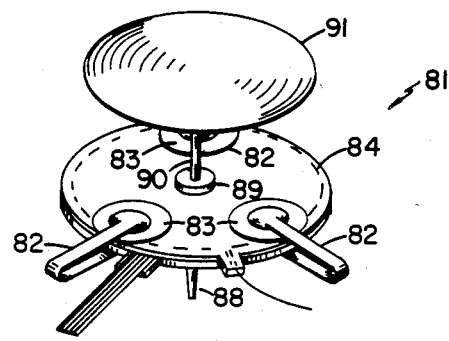
FIG. 9 is a perspective view of the pan and sensor assembly of FIG. 8 assembled.

For example, FIGS. 8 and 9 illustrate another embodiment 81 of the pan and sensor assembly 21 shown in FIGS. 4 and 5. In this embodiment 81 the top pan 20, bottom pan 22, top rigid disk 36 and bottom rigid disk 37 of FIGS. 4 and 5 are eliminated. This embodiment 81 uses three leaf springs 82 directly interconnecting the capacitor plates 38 and 39. One end 83 of each spring 82 is fixedly attached to the upper face 84 of the top capacitor plate 38, and the other end 85 of each spring 82 is fixedly attached to the bottom face 86 of the bottom capacitor plate 39. Extending vertically downward from the center 87 of the bottom face 86 of the bottom capacitor plate 39 is a rigid member 88, one end of which is fixedly attached to said center 87 and the other end of which is fixedly attached to the printed circuit board 50 or casing bottom 12 shown in FIG. 3, either of which would be acting thereby as a base for the the pan and sensor assembly 81. The support posts 35, or a portion thereof, could be eliminated in this embodiment 81. Extending vertically upward from the center 89 of the upper face 84 of the top plate 38 is another rigid member 90, one end of which is fixedly attached to said center 89, and the other end of which is fixedly and centrally attached to a shallow pan 91 lying in a plane parallel to the planes of the plates 38 and 39. When the item 3 being weighed is placed on the pan 91, any off-center placement of the item 3 will be translated through the member 90 to the top plate 38, not only as a downward force, but also as a tipping force. As with the first embodiment 21 of the pan and sensor assembly, the sensors $S_1$, $S_2$, and $S_3$ will measure different values corresponding to the item's 3 weight and position on the pan 91.

I claim:

1. A self-adjusting weighing system comprising:
   a pan for receiving a load to be weighed;
   a plurality of springs connected about the periphery of the said pan to a base and individually responsive to the pan's position as a result of the load to be weighed being placed thereon;
   a plurality of sensors adapted to measure the load on said pan, positioned and connected between the pan and base, within the pan's periphery;
   electronic means which measures the effect of pan movement on said sensors due to load off-center placement, which adjusts for spring and sensor manufacturing variabilities, and which calculates a resultant weight;
   means for calculating and entering adjustment coefficients for spring and sensor manufacturing variabilities into said electronic means; and
   means for outputting said resultant weight.

2. A self-adjusting weighing system as recited in claim 1, wherein:
   said sensors are capacitors.

3. A self-adjusting weighing system as recited in claim 2, wherein:
   the capacitors are formed between two rigid, closely-spaced, non-conductive plates with specific conductive patterns on their facing surfaces, one said plate being rigidly attached to the pan and the other said plate being attached to the base.

4. A self-adjusting weighing system as recited in claim 3, wherein:
   the conductive pattern on the said plate attached to said pan is a solid three hundred sixty degree region covering its face.

5. A self-adjusting weighing system as recited in claim 4, wherein:
   the conductive pattern on the said plate attached to said base consists of a plurality of separate regions.

6. A self-adjusting weighing system as recited in claim 5, wherein:
   said springs are leaf springs.

7. A self-adjusting weighing system as recited in claim 6, wherein:
   said leaf springs interconnect said pan with said base.

8. A self-adjusting weighing system as recited in claim 7, wherein:
   said pan and said base consist of two, rigid, concave pans in mirror relationship with each other, having their resultant convex surfaces facing each other.

9. A self-adjusting weighing system as recited in claim 8, further comprising:
   two small, flat, rigid disks, one each being fixedly attached centrally between a said pan convex surface and a said plate whereby the off-center placement of the load to be weighed is translated into a predictable disk tipping movement thereby compensating for any tendency of the said pan to twist due to the said off-center placement of the load to be weighed.

10. A self-adjusting weighing system comprising:
    a rigid, spring-supported pan for receiving a load to be weighed;

a plurality of springs symmetrically connected about the periphery of the said pan to a base, and individually responsive to the pan's position as a result of the load to be weighed being placed thereon;

a plurality of sensors symmetrically positioned and connected between the pan and the base, within the pan's periphery;

electronic means which measure the effects of pan movement on said sensors due to load off-center placement, which adjusts for spring and sensor manufacturing variabilities, and which calculates a resultant weight;

means for calculating and entering adjustment coefficients for spring and sensor manufacturing variabilities into said electronic means; and means for outputting said resultant weight.

11. A self-adjusting weighing system as recited in claim 10, wherein:
said sensors are capacitors.

12. A self-adjusting weighing system as recited in claim 11, wherein:
the capacitors are formed between two round, rigid, closely spaced, nonconductive plates with specific conductive patterns on their facing surfaces, one said plate being rigidly attached to the pan and the other said plate being rigidly attached to the base.

13. A self-adjusting weighing system as recited in claim 12, wherein:
the conductive pattern on the said plate attached to said base consists of three separate, symmetrical, pie-shaped regions extending from the plate's center to the plate's periphery.

14. A self-adjusting weighing system as recited in claim 13, wherein:
the conductive pattern on the said plate attached to said pan is a solid three hundred sixty degree region covering its face.

15. A self-adjusting weighing system as recited in claim 14, wherein:
said springs are leaf springs.

16. A self-adjusting weighing system as recited in claim 15, wherein:
said pan and said base consist of two, rigid, concave pans in mirror relationship with each other, having their resultant convex surfaces facing each other.

17. A self-adjusting weighing system as recited in claim 16, wherein:
said leaf springs symmetrically interconnect each pan.

18. A self-adjusting weighing system as recited in claim 17, further comprising:
two small, flat, rigid disks, one each being glued centrally between a said pan convex surface and a said plate whereby the off-center placement of the load to be weighed is translated into a predictable disk tipping movement thereby compensating for any tendency of the said pan to twist due to the said off-center placement of the load to be weighed.

19. A self-adjusting weighing system as recited in claim 18, whereby:
said pie-shaped regions are one hundred twenty degrees.

20. A self-adjusting weighing system comprising:
a pan for receiving a load to be weighed;
a plurality of transducers positioned about the pan and adapted to measure the load on said pan;
means for correcting an error in the measured value of said load due to off-center placement of said load on said pan, comprised of electronic means which measures the effect of pan movement on said transducers due to load off-center placement, which adjusts for transducer manufacturing variabilities, and which calculates a resultant weight, and means for calculating and entering adjustment coefficients for spring and sensor manufacturing variabilities into said electronic means; and
means for outputting said corrected measured value.

21. A self-adjusting weighing system as recited in claim 20, wherein said transducers comprise:
a plurality of capacitors formed between two rigid, closely-spaced, non-conductive, parallel and facing plates with conductive patterns on their facing surfaces; and
a plurality of springs positioned about the periphery of said plates and interconnecting said plates.

22. A self-adjusting weighing system as recited in claim 21, wherein said plates comprise an upper plate and a lower plate.

23. A self-adjusting weighing system as recited in claim 22, wherein:
said pan is attached to said upper plate and lies in a plane parallel to the planes of the said plates.

24. A self-adjusting weighing system as recited in claim 23, wherein:
the conductive pattern on the said plate attached to said pan is a solid three hundred sixty degree region covering its facing surface.

25. A self-adjusting weighing system as recited in claim 24, wherein:
said lower plate is attached to a base within the said weighing system.

26. A self-adjusting weighing system as recited in claim 25, wherein:
the conductive pattern on the said plate attached to said base consists of a plurality of separate regions covering its facing surface.

27. A self-adjusting weighing system as recited in claim 26, wherein:
said springs are leaf springs.

28. A self adjusting weighing system as recited in claim 27, further comprising:
a rigid member extending vertically downward from the nonfacing surface of the bottom plate, one end of which member is fixedly attached to said plate, and the other end of which member is fixedly attached to said base; and
a second rigid member extending vertically upward from the nonfacing surface of the upper plate, one end of which member is fixedly attached to said plate, and the other end of which member is fixedly attached to said pan.

* * * * *